United States Patent [19]

Kawanishi

[11] 4,446,938
[45] May 8, 1984

[54] COMBINATION WEIGHING MACHINE
[75] Inventor: Shozo Kawanishi, Kobe, Japan
[73] Assignee: Yamato Scale Company. Ltd., Hyogo, Japan
[21] Appl. No.: 387,187
[22] Filed: Jun. 10, 1982
[51] Int. Cl.³ .................... G01G 19/22; G01G 13/24; B07C 5/00
[52] U.S. Cl. .................................. 177/25; 177/114; 209/638
[58] Field of Search .................. 177/25, 114; 209/598, 209/638

[56] References Cited

U.S. PATENT DOCUMENTS

| | | | |
|---|---|---|---|
| 4,267,894 | 5/1981 | Hirano et al. | 177/25 |
| 4,308,928 | 1/1982 | Oshima | 177/25 |
| 4,398,612 | 8/1983 | Mikama et al. | 177/25 |

*Primary Examiner*—George H. Miller, Jr.
*Attorney, Agent, or Firm*—Eugene E. Geoffrey, Jr.

[57] ABSTRACT

A combination weighing machine, which is generally used for packing a plurality of articles in individual bags or the like so that the total weight of each bag becomes nearly equal to a predetermined target weight, including a plurality of weighing balances for weighing the articles at the same time, arithmetic means for selecting some of these balances so that the total weight of the articles thereon satisfies a predetermined condition and means for unloading the selected balances to collect the articles thereon and then loading them with new articles, respectively, to initiate the next cycle of operation; each balance being accompanied with one or more temporary holding hoppers and corresponding memories, and means for distributing the articles on the balance to these hoppers and, at the same time, feed weight information thereof to the corresponding memories, in order to subject the articles in the hoppers to the selection by the arithmetic means together with the articles on the balance, thereby improving weighing efficiency and accuracy without increasing the number of expensive weighing balances.

3 Claims, 6 Drawing Figures

COMBINATION WEIGHING MACHINE

This invention relates to an improved combination weighing machine having increased efficiency and improved accuracy.

The weighing device, which is generally referred to as a "combination balance" or "combination weighing machine" is used for extracting a plurality of articles from a group of articles, such as candies, fruits or vegetables, having a relatively large variance in their unit weights, to form a subgroup having a weight nearly equal to a predetermined target weight. An example of such a device is described in U.S. Pat. No. 4,267,894. It can be easily understood that the efficiency of selecting articles having a total weight which satisfies a specific condition from all weighing balances and the accuracy of the total weight of the selected articles should increase with the number of the balances used. However, the increase of the number of relatively expensive weighing balances results necessarily in an unwanted increase of the machine price. In order to overcome this problem, an idea was proposed by U.S. Pat. No. 4,308,928. The combination weighing machine of this patent includes a single weighing balance but a plurality of holding hoppers and corresponding memories for storing weight information of the articles in the hoppers, and effects the selecting operation using the contents of these memories. Although this machine has attained a reduced manufacturing cost due to use of only one weighing balance, it must be provided with a bulky distributing device for distributing the articles weighed by the single balance to the respective holding hoppers, which has resulted in unwanted increase in the overall volume and weight of the machine. Moreover, this machine has the fatal disadvantage that its one cycle time of operation cannot be less than the lengthy time for distributing the articles sequentially to all of the vacant hoppers.

Accordingly, an object of this invention is to provide an improved combination weighing machine having a plurality of weighing balances which are not more than those in the prior art device but exhibiting increased efficiency and accuracy which are similar to those obtained when the number of the balances is greatly increased.

This object can be attained substantially by the combination weighing machine according to this invention which includes a plurality of weighing balances each having a weighing cradle for weighing articles respectively and a collection chute. Each of the weighing balances is accompanied with at least a temporary holding hopper and means for transferring the articles in the weighing cradle to the holding hopper. The machine includes also a plurality of memories corresponding respectively to the temporary holding hoppers and means for writing the weight information obtained from each weighing balance to the memory at the same time as the transfer of the articles to the corresponding holding hopper. The machine further includes means for selecting a combination of weight information so that the total weight satisfies a predetermined condition from all of the contents of the memories and the current outputs of the weighing balances and means for discharging the articles into the collection chute from the holding hoppers and/or weighing cradles which relate to the selected combination.

Now, the invention will be described hereinunder in more detail in conjunction with a preferred embodiment with reference to the accompanying drawings.

IN THE DRAWINGS

Throughout the drawings, like reference numerals are used to denote corresponding elements.

Figure 1:
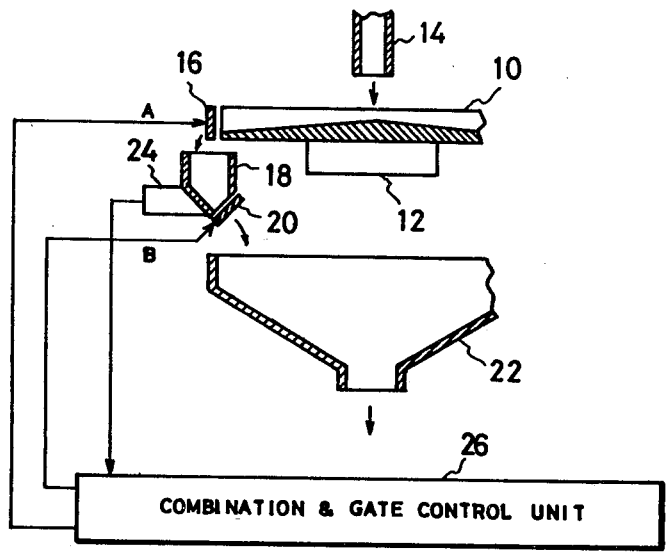
FIG. 1 is a schematic diagram representing a typical arrangement of a prior art combination weighing machine.

Referring now to FIG. 1, which shows a schematic view of a mechanical arrangement of a typical automatic combination weighing machine according to the prior art. The machine includes a vibration feeder 10 having a slightly conical bottom wall and a peripheral side wall. The feeder 10 is provided with a vibrator 12 for applying vibration to the bottom wall so that articles supplied from a central chute 14 are shifted outwardly to the peripheral portion. The peripheral wall of the feeder 10 has a plurality of exit ports each having a gate 16. The gates 16 are normally closed and selectively opened under control of loading signals A from a combination and gate control unit 26 as described later. The machine also includes a plurality of weighing balances arranged surrounding the feeder 10 so that their weighing cradles 18 are disposed respectively just under the exit ports of the feeder 10. Although only one of the weighing cradles is shown in the drawing for simplification, it is understood that the articles on the feeder 10 are fed into some of the weighing cradles 18 when the corresponding gates are opened. Each weighing cradle 18 has bottom opening having a gate 20 which is normally closed and selectively opened under control of an unloading signal B from the combination and gate control unit 26 as also described later. Each weighing balance also includes a weight sensor 24, such as a load cell, which produces an electric signal indicative of the weight of articles in the cradle 18 and supplies it to the combination and gate control circuit 26. Under the unloading gates 20 of the respective weighing balances, a common collecting hopper 22 is disposed for collecting the articles discharged from the selected weighing balances. The articles collected in the hopper 22 are transferred by suitable means (not shown) for packing.

Figure 2:
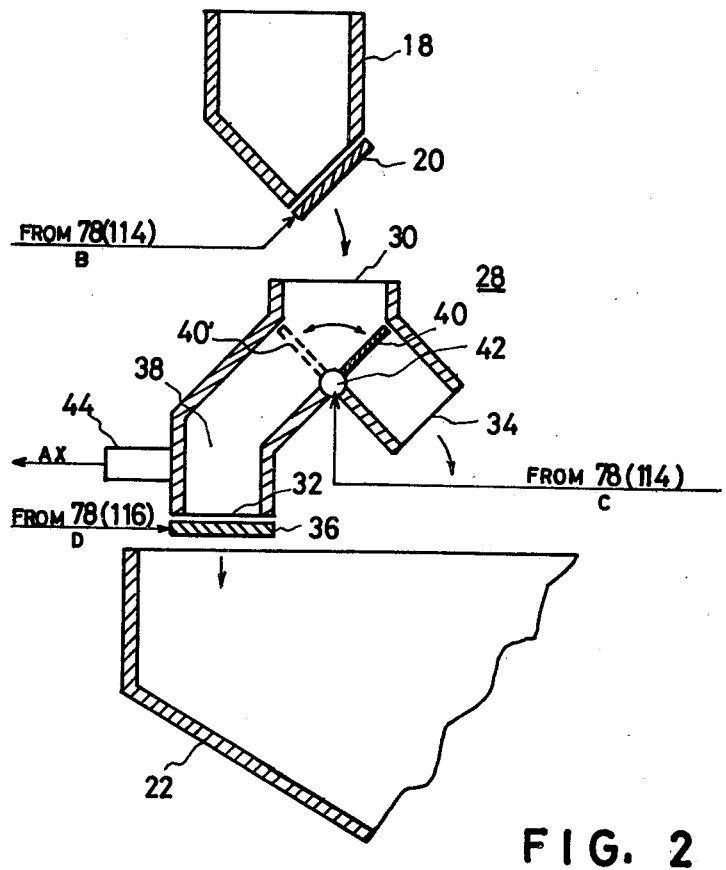
FIG. 2 is a schematic sectional view of a part of the improved combination weighing machine representing a preferred structure according to this invention.

FIG. 2 shows an auxiliary hopper structure 28 added in accordance with this invention to the automatic combination weighing machine of FIG. 1. As shown, the structure 28 is inserted between the weighing cradle 18 of each weighing balance and the collecting hopper 22 and provided with a common entrance 30 disposed just under the exit port of the cradle 18 and separate exit ports 32 and 34. The exit port 32 has a normally-closed gate 36 to form therein an auxiliary hopper cavity 38 for temporarily holding the articles, while the exit port 34 is always open. A butterfly valve vane 40 rotating about an axis 42 is disposed at the parting to the exits 32 and 34 and arranged so that while it is normally in a position as shown by the vane 40 to close the exit port 34, it moves to another position as shown by ghost 40' to close the auxiliary hopper 38 under control of gate control signal C supplied from a gate control circuit 78 as described later. Similarly, the gate 36 is opened under control of another control signal D supplies also from the circuit 78. The auxiliary hopper 38 is provided with a suitable optical, mechanical or like sensing device 44 for sensing the presence of articles therein to produce a signal AX which is used in various circuits as described later.

Figure 3:
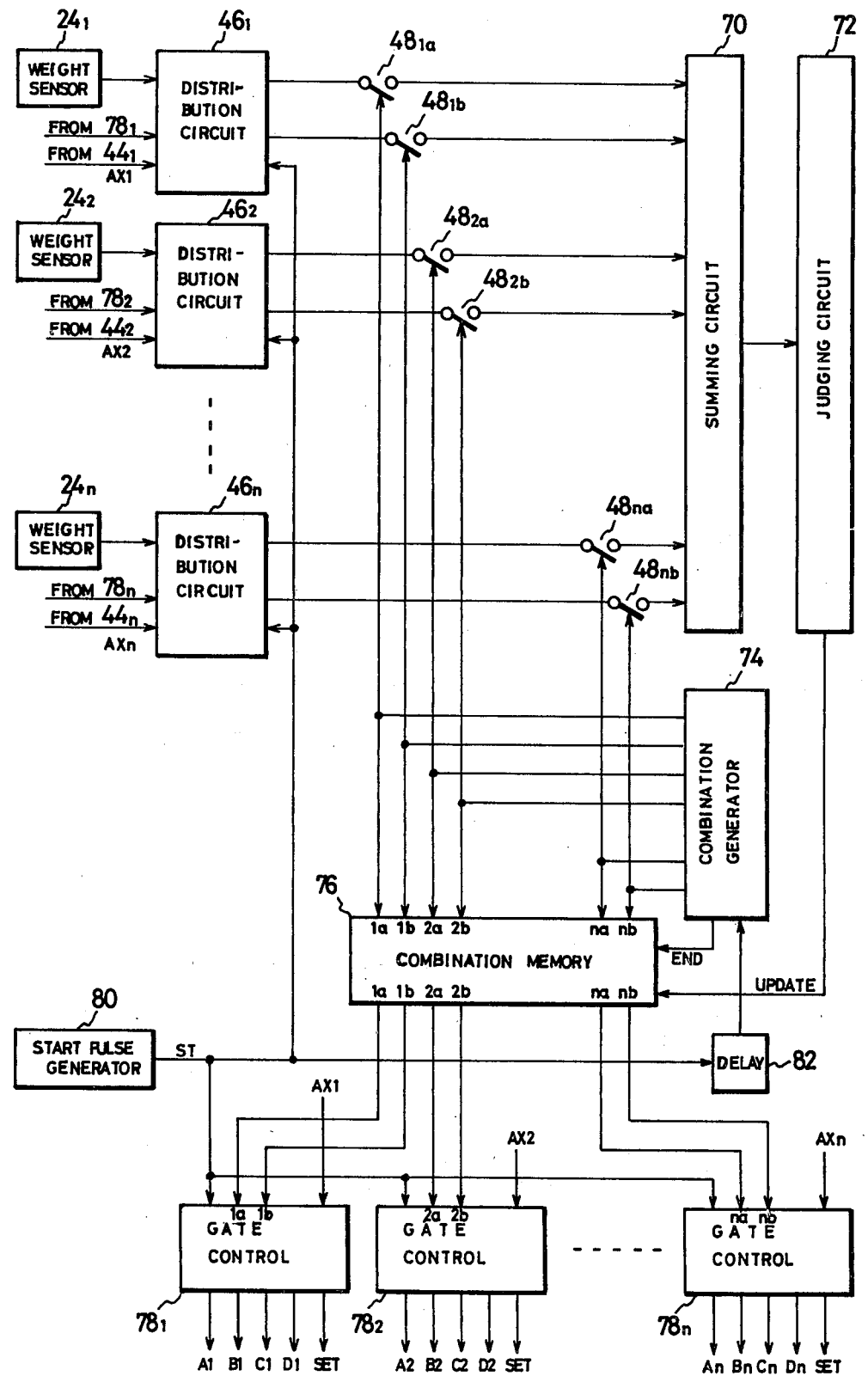
FIG. 3 is a block diagram representing an embodiment of a circuit configuration of the combination weighing machine according to this invention.

FIG. 3 shows, in block form, a complete circuit arrangement of the automatic combination weighing machine according to this invention. It is assumed that the machine includes n-number of weighing balances as a general case. The weighing balances have weight sensors $24_1, 24_2, \ldots 24_n$, respectively, having outputs coupled to distribution circuits $46_1, 46_2, \ldots 46_n$, respectively, which are inserted for practicing the invention and will be described later in conjunction with FIG. 4.

The distribution circuits $46_1, 46_2, \ldots 46_n$ have a pair of output terminals which are coupled respectively through normally-open switches $48_{1a}, 48_{1b}; 48_{2a}, 48_{2b}; \ldots 48_{na}, 48_{nb}$ to a summing circuit 70. The summing circuit 70 sums the incoming weight signals to provide a sum signal to a judging circuit 72. The judging circuit 72 compares the sum signal with a preset condition and produces an update signal UPDATE when the condition is satisfied. The arrangement of the judging circuit is known in the art and some examples are described in the aforementioned United States patents. The normally-open switches 48 have control terminals coupled respectively to 2n-number of output terminals of a combination generator 74.

The combination generator 74 is driven by a clock pulse train produced by a suitable clock circuit included therein and produces a binary signal "1" or "0" from each output terminal in accordance with a predetermined set of mathematical combinations. Each normally-open switch 48 is closed in response to the output "1" and passes the corresponding weight signal to the summing circuit 70. As well known in the art, there are $(2^{2n}-1)$ combinations, in total of the 2n-number of output terminals of the combination generator 74. In order to produce all of these combinations, the combination generator 74 may be composed of a 2n-bit binary counter for counting the clock pulses, having its bit or parallel outputs coupled to the output terminals, respectively. The combination generator 74 is arranged to start its operation in response to a start signal ST supplied from a start pulse generator 80 through a delay circuit 82 and produce an end signal END when it completes each cycle of operation, as described later.

The outputs of the combination generator 74 are also coupled respectively to 2n-number of input terminals (1a, 1b, 2a, 2b, ... na, nb) of a combination memory 76 having the same number of corresponding output terminals (1a, 1b, 2a, 2b, ... na, nb). The combination memory 76 is arranged to update its content with its current input in response to the UPDATE signal from the judging circuit 72 and discharge its contents from the corresponding output terminals in response to the END signal from the combination generator 74. Thus, the combination memory 76 produces binary "1" outputs in every cycle of operation from some of its output terminals 1a, 1b, 2a, 2b, ... na and nb which correspond to the outputs of the distribution circuits $46_1, 46_2, \ldots 46_n$, which have produced those weight signals the sum of which best satisfies the present condition. The n pairs of outputs of the combination memory 76 are coupled respectively to n gate control circuits $78_1, 78_2, \ldots 78_n$ as their first and second input (1a, 1b, etc.), as described later.

Figure 4:
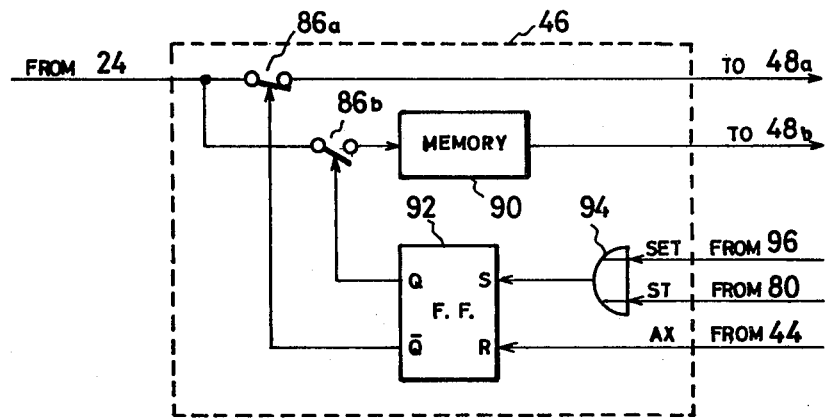
FIGS. 4 and 5 are block diagrams representing examples of the two blocks in the circuit of FIG. 3, namely the distribution circuit and gate control circuit; and, FIG. 6 is a logic circuit diagram representing an example of the logic circuit in FIG. 5.

FIG. 4 shows a preferred embodiment of the distribution circuits $46_1, 46_2, \ldots 46_n$. All of these circuits are exactly the same in both structure and operation and, therefore, the description will be made in conjunction with a specific one of them. The suffix numerals 1, 2, ... n of the reference numerals, which indicate the serial numbers of corresponding weighing balances, are omitted from the drawing for the purpose of simplification and generalization. The distribution circuit 46 has a single input terminal coupled to the weight sensor 24 (FIG. 1) and a pair of output terminals coupled respectively to the normally-open switches 48a and 48b. As shown in the circuit, the input terminal is coupled through a normally-closed switch 86a to the first output terminal and also coupled through a normally-open switch 86b and a memory 90 to the second output terminal. The switches 86a and 86b have control terminals coupled respectively to both output $\overline{Q}$ and Q of a flip-flop circuit 92 having a set input S coupled to the output of an OR gate 94 for receiving the start signal ST from the start pulse generator 80 or a set signal SET from the corresponding gate control circuit 78 and the reset input R of which is coupled for receiving the detection signal AX from the corresponding sensing device 44 (FIG. 2).

Next, a preferred embodiment of the gate control circuits $78_1, 78_2, \ldots 78_n$ will be described in detail with reference to FIGS. 5 and 6. The suffix numerals are omitted also from these drawings for the same purpose as in FIG. 4. A pair of outputs a and b of the combination memory 76 are applied to the gate control circuit 78 at the inputs of a logic circuit 96 which will be described later with reference to FIG. 6. The logic circuit 96 has a first output coupled to the first input of an OR gate 98, the second input of which is the signal AX from the corresponding sensing device 44 (FIG. 2), and a second output coupled to the first input of an OR gate 100 and to the abovementioned OR gate 94 as a SET signal (FIG. 4). The second input of the OR gate 100 is the start signal ST from the start pulse generator 80. The output signal a of the combination memory 76 is also applied through a normally-open switch 104 to a third input of the OR gate 100 and first input of an OR gate 102 and, through a normally-open switch 106 to a fourth input of the OR gate 100 and second input of the OR gate 102. The outputs of the OR gates 98, 100 and 102 are supplied to gate drive circuits 110, 112 and 114. The second output signal b of the combination memory 76 is also applied through an invertor 108 to the control terminal of the switch 104 and directly to the control terminal of the switch 106 and a gate drive circuit 116. The gate drive circuits 110, 112, 114 and 116 are arranged to produce gate driving pulses having appropriate durations for moving the gates 16, 20, 42 and 36 (FIGS. 1 and 2), respectively, in response to their inputs. These gate drive circuits will not be described further since they can be easily designed by those skilled in the art.

Figure 5:
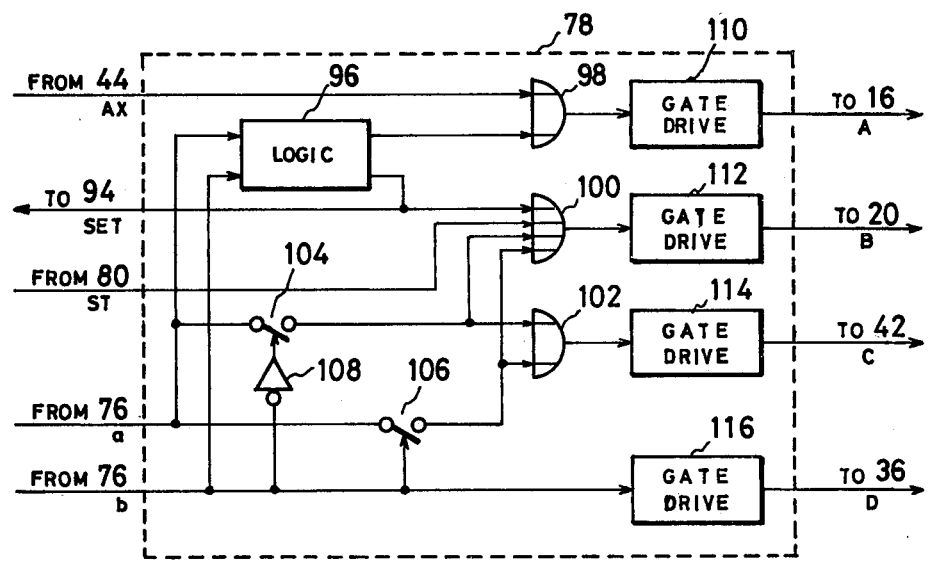
Figure 6:
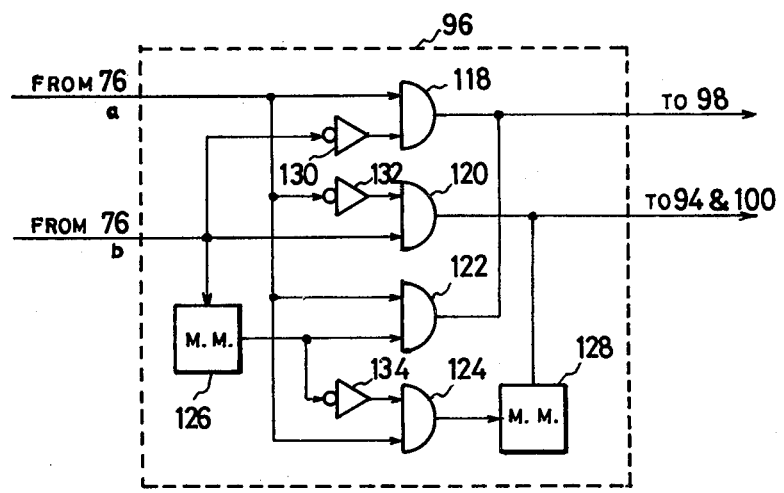

Referring now to FIG. 6 showing an example of the logic circuit 96 of FIG. 5, four AND gates 118, 120, 122 and 124, two monostable multivibrators 126 and 128 and three invertors 130, 132 and 134 are included. The first input a is applied directly to the AND gates 118, 122 and 124 and through the invertor 132 to the AND gate 120. The second input b is applied through the invertor 130 to the AND gate 118 and directly to the AND gate 120 and the monostable multivibrator 126 having its output coupled through the invertor 134 to the AND gate 124 and directly to the AND gate 122. The outputs of the AND gates 118 and 122 are coupled in common to the first output terminal for the OR gate 98. The output of the AND gate 124 is coupled to the monostable multivibrator 128 having its output coupled in common with the output of the AND gate 120 to the second output terminal for the OR gates 100 and 94.

In operation, the start pulse generator 80 produces a train of start pulses ST at a predetermined time interval which is essentially equal to one cycle time of operation of this machine. Before starting the description of operation, it is assumed that all the weighing cradles 18 of the machine have been loaded with articles and the corresponding weight signals are provided from the respective weight sensors 24 to the corresponding distribution circuits 46. The description will be made mainly in conjunction with the auxiliary hopper structure 28 of FIG. 2, distribution circuit 46 of FIG. 4 and gate control circuit 78 of FIG. 5 which belong to a specific weighing balance, since the same description can be applied to the others. Therefore, the suffix numerals of the reference numerals, which indicate the serial numbers of the weighing balances, are omitted.

Referring to FIG. 4, the start signal ST is applied through the OR gate 94 to the set input S of the flip-flop 92 to set it. Then, the flip-flop 92 applies its Q output "1" and $\overline{Q}$ output "0" to the control terminals of the switches 86b and 86a, respectively, to open the former and close the latter. Accordingly, the weight signal from the weight sensor 24 is supplied through the closed switch 86b to the memory 90 and stored therein. The start pulse ST is also applied through the OR gate 100 to the gate drive circuit 112 of the gate control circuit 78, as shown in FIG. 5. The gate drive circuit 112 provides a gate drive pulse B to a gate driving mechanism (not shown) of the gate 20 of the weighing cradle 18 to open it. Thus, the articles in the cradle 18 are discharged into the auxiliary hopper 38 of the structure 28 which is in the state as shown in FIG. 2. Then the sensing device 44 senses these articles to provide a detection signal AX to the reset input R of the flip-flop 92 to reset it. Accordingly, the switches 86a and 86b are turned to the original state as shown in FIG. 4. At the same time, the signal AX is applied also through the OR gate 98 to the gate drive circuit 110, which provides a gate drive pulse A to a gate driving mechanism (not shown) of the gate 16 (FIG. 1) to open it. Thus, the vacant cradle 18 is loaded again with new articles from the feeder 10 and the corresponding weight signal is provided from the sensor 24 through the closed switch 86a to the normally-open switch 48a (FIG. 3). As the content of the memory 90 is also applied to the normally-open switch 48b (FIG. 3), the distribution circuit 46 is now providing a pair of weight signals. Thus, the weight signals participating in the combinations are doubled with respect to the prior art device, without additional weighing balances.

The delay time of the delay circuit 82 (FIG. 3) is previously selected to be substantially equal to the time which is needed in executing the above mentioned operation. In other words, the delay circuit 82 applies the start pulse ST to the combination generator 74 just after all the weighing cradles 18 have been loaded again. In response to the start pulse ST applied to the combination generator 74, the combination selection network consisting of the switches 48, summing circuit 70, judging circuit 72, combination generator 74 and combination memory 76 initiates its operation and, at the end of each operation cycle, the combination memory 76 provides a binary signals "1" from certain output terminals belonging to a selected combination and binary signals "0" from the remaining output terminals, to corresponding input terminals of the gate control circuits 78. Such operation of the combination selection network is well known in the art as described in the aforementioned U.S. patents, for example, and will not be described further.

As shown in FIGS. 3, 5 and 6, the gate control circuit 78 receives a pair of outputs a and b from the combination memory 76. When both inputs a and b are binary "0", it will be easily understood from FIGS. 5 and 6 that the gate drive circuits 110, 112, 114 and 116 provide no output unless the signal AX or ST is applied. In this case, therefore, there will be no change in the status.

However, when the input a is "0" and the input b is "1", the gate drive circuit 116 is actuated by the input b to provide a gate drive pulse D to a driving mechanism (not shown) of the gate 36 of the auxiliary hopper 36 (FIG. 2) to open it to discharge the articles in the hopper into the collection hopper 22. Further, the AND gate 120 of the logic circuit 96 provides an output "1" to the flip-flop 92 through the OR gate 94 (FIG. 4) to set it, thereby closing the switch 86b and opening the switch 86a. Thus, the weight of the articles in the cradle 18 is written in the memory 90. The output "1" of the AND gate 120 is also applied through the OR gate 100 to the gate drive circuit 112 and the circuit 112 provides a gate drive pulse B to the gate 20 of the above cradle 18 to open it to discharge the articles therein into the vacant auxiliary hopper 38. As described previously, these articles are detected by the sensing device 44 and the detection signal AX actuates the gate drive circuit 98 to provide a gate drive pulse A to open the gate 16 for again loading the cradle 18 and also reset the flip-flop 92 to close the switch 86a and open the switch 86b. Thus, the initial condition is restored. It should be noted that the timing relationship of the gate drive circuit 110, 112 and 116 is previously determined so that the drive pulse A starts after the drive pulse B ends or the gate 20 is closed, and that the drive pulse B starts after the drive pulse D ends or the gate 36 is closed.

When the input a is binary "1" and the input b is binary "0", the "0" input b closes the normally-open switch 104 through the invertor 108 to pass the "1" input a to the OR gate 102 and to the gate drive circuit 114, which provides a gate drive pulse C to the control mechanism (not shown) of the valve vane 40 to move it to the ghost position 40'. The "1" input a is also applied through the switch 104 to the OR gate 100 and to the gate drive circuit 112, which provides a gate drive pulse B to open the gate 20 to discharge the articles in the cradle 18 through the exit port 34 into the collection hopper 22 (FIG. 2). The duration of the gate drive pulse C is predetermined so that the vane 40 returns its initial position as shown by solid line after the articles are discharged completely. The inputs a and b also actuate the AND gate 118 and the AND gate 118 applies its output "1" through the OR gate 98 to the gate drive circuit 110, which similarly opens the gate 16 to load the vacant cradle 18 with new articles. Thus, the initial condition is restored.

Finally, when the inputs a and b are binary "1", the "1" input b is applied to the gate drive circuit 116 to open the gate 36 to discharge the articles in the auxiliary hopper 38 into the collection hopper 22, as described above. The "1" input b also closes the normally-open switch 106 to pass the "1" input a to the OR gates 102 and 100 to turn the valve vane 40 to the ghost position 40' and open the gate 20 by the gate drive pulses C and B from the gate drive circuits 114 and 112, respectively. This results in discharge of the articles in the cradle 18 through the outlet port 34 into the collection hopper 22. Thus, the articles in the cradle 18 and auxiliary hopper 38 are both collected in the collection hopper 22. The "1" input b is also applied to the monostable multivibrator 126 to cause it to provide a pulse having a predetermined duration to the AND gate 122. Therefore, the AND gate 122 applies its "1" output through the OR gate 98 to the gate drive circuit 110, thereby loading the vacant cradle 18 with new articles. The pulse duration of the multivibrator 126 is preset so that the pulse ends just after completion of loading of the cradle 18. Accordingly, just after the cradle 18 is loaded, the AND gate 124 produces a "1" output to actuate the second monostable multivibrator 128 to cause it to produce a pulse having a predetermined duration. This pulse is applied through the OR gate 94 to the flip-flop 92 to set it to close the switch 86b and open the switch 86a (FIG. 4). Thus, the weight of the articles in the cradle 18 is stored in the memory 90. As the output of the multivibrator 128 is also applied through the OR gate 100 to the gate drive circuit 112, the gate 20 is opened to discharge the articles in the cradle 18 into the auxiliary hopper 38. Then the sensing device 44 provides a detection signal AX through the OR gate 98 to the gate drive circuit 110 for loading the vacant cradle 18 with new articles, and also provides the signal AX to the flip-flop 92 to reset it into the initial condition as shown in FIG. 4. The duration of the output pulse of the multivibrator 128 is preset so that the pulse ends after completion of discharge of the cradle 18. Thus, the initial condition is restored.

When a selected one of the above-described four kinds of operation is completed in each of the n weighing sections of the machine, the current operation cycle ends and whereupon the next start signal ST is supplied from the start pulse generator 80 to initiate the next operation cycle.

Although, in the above-described embodiment, a single auxiliary hopper 38 is associated with each weighing cradle 18, two or more auxiliary hoppers can be associated if the distribution circuit 46 and gate control circuit 78 are designed adequately. Moreover, the mechanical and electrical configurations shown in the drawings have been presented as mere examples and various modifications and changes can be made without leaving the scope of this invention as defined in the appended claims.

What is claimed is:

1. A combination weighing machine comprising a plurality of weighing units each having a weighing cradle for weighing articles in the cradles to produce weight signals indicative of the weights thereof, a common collection hopper, a combination selection circuit coupled for receiving said weight signals for summing said weight signals in accordance with predetermined mathematical combinations and selecting a combination having a sum which satisfies a predetermined condition to produce outputs specifying those of said weighing cradles belonging to said selected combination, first gate means responsive to said outputs for transferring the contents of said specified weighing cradles to said common collection hopper the improvement comprising at least one auxiliary hopper associated with each weighing unit, a memory associated with said auxiliary hopper for supplying its content to said combination selection circuit to cause it to participate in said combinations together with said weight signals from said weighing cradles, switching means for coupling temporarily the output of said weighing unit to the input of said memory to write said weight signal in said memory, second gate means for transferring the content of said weighing cradle to said auxiliary hopper associated with said memory after writing-in of said weight signal and third gate means responsive to an output of said combination selection circuit when the last said output specifies said memory for transferring the content of said auxiliary hopper to said common collection hopper.

2. A combination weighing machine according to claim 1 the improvement further comprising means associated with said auxiliary hopper for detecting the articles transferred to auxiliary hopper to produce an output signal and means responsive to said output signal for loading said cradle with new articles.

3. A combination weighing machine according to claim 1 characterized in that said first and second gate means constitute a distributing structure including a common inlet port communicating with said weighing cradle, a first path communicating with said auxiliary hopper, a second path communicating with said common collection hopper and said second gate means includes valve means for selectively closing one of said first and second paths.

* * * * *